United States Patent [19]

Kwon

[11] Patent Number: 5,442,937
[45] Date of Patent: Aug. 22, 1995

[54] APPARATUS FOR DETERMINING A TILT ANGLE OF A TUB IN A CONVERTIBLE WASHING MACHINE

[75] Inventor: Ho C. Kwon, Kyungsangnam, Rep. of Korea

[73] Assignee: Goldstar Co., Ltd., Rep. of Korea

[21] Appl. No.: 175,720

[22] Filed: Dec. 30, 1993

[30] Foreign Application Priority Data

Jan. 20, 1993 [KR] Rep. of Korea .................. 1993-685

[51] Int. Cl.$^6$ .............................................. D06F 35/00
[52] U.S. Cl. ......................................... 68/4; 68/12.27; 68/25
[58] Field of Search .............................. 68/4, 12.27, 25

[56] References Cited

U.S. PATENT DOCUMENTS 5,327,603  7/1994  Roh et al. .......................... 68/25 X

*Primary Examiner*—Philip R. Coe

[57] ABSTRACT

An apparatus for controlling a tilt angle of a tub in a convertible washing machine which converts between drum type washing and pulsator type washing. The convertible washing machine includes a tub shaft which rotates the tub, and a tilt angle motor for changing a tilt angle of the tub to effect conversion of the convertible washing machine between drum type washing and pulsator type washing. The apparatus includes a structure which rotates with the tub and includes at least first and second projections. At least first and second reference structures are fixed to the convertible washing machine such that the first and second reference structures are stationary when the tub rotates. The first reference structure detects when one of the first and second projections is at a first predetermined position, and the second reference structure detects when one of the first and second projections is at a second predetermined position.

25 Claims, 13 Drawing Sheets

(TUB VERTICAL)

(TUB HORIZONTAL)

( TUB 45° )

VERTICAL → HORIZONTAL

HORIZONTAL → VERTICAL

VERTICAL → 45°

45° → VERTICAL

APPARATUS FOR DETERMINING A TILT ANGLE OF A TUB IN A CONVERTIBLE WASHING MACHINE

BACKGROUND OF THE INVENTION

1. Field of the Invention

The present invention relates to a convertible washing machine having a tub tiltable from a vertical position to a horizontal position to selectively perform the pulsator type washing and the drum type washing, and more particularly to an apparatus for and method of determining a tilt angle of the tub in such a convertible washing machine, capable of controlling the tub to be positioned at various tilt angles such as 90° corresponding to the vertical position, 0° corresponding to the horizontal position and 45°, thereby enabling the pulsator type washing, the drum type washing and the small load washing.

2. Description of the Prior Art

A "convertible washing machine" means a washing machine having a tub tiltable through an angle ranged from 0° to 90° with respect to a tub shaft so that it can performs conventional pulsator type washing at a tub tilt angle of 90° corresponding to the vertical position of the tub and a conventional drum type washing at a tub tilt angle of 0° corresponding to the horizontal position of the tub.

FIG. 1 is a partially-broken elevational view of conventional convertible washing machine. In FIG. 1, the reference numeral 1 denotes an outer case, 2 an outdoor, 3 a cover, 4 a base plate, 5 a rear cover, 6 a damper, 7 a pulsator motor, 8 a drum pulley, 9 a pulsator pulley, 10 a damper bracket, 11 a tub, 12 a drum motor, 13 a bearing housing, 14 a tub shaft, 15 a worm gear, 16 and 16' switches, 16a and 16a' respective leads of switches 16 and 16', 17 a worm motor, and 18 a worm.

As shown in FIG. 2, the worm gear 15 has a pair of stoppers 20 and 20' respectively formed at its opposite ends, and a pair of mounting holes 19 and 19' perforated through its inner portion having no gear tooth.

The worm gear 15 is fixedly mounted to the bearing housing 13 by means of the mounting holes 19 and 19'. The worm motor 17 is fixedly mounted to one side portion of the tub 11. To the worm motor 17, the worm 18 is rotatably coupled.

A tub tilting operation and a tub tilt angle sensing operation performed in the conventional convertible washing machine will now be described.

As the worm motor 17 drives under a condition that the tub 11 is kept at its vertical position corresponding to the tub tilt angle of 90°, as shown in FIG. 1, the worm 18 rotates by the drive force of the worm motor 17.

By the rotation of the worm 18, the tub 11 rotates about the tub shaft 14 toward its horizontal position because the worm 18 is engaged with the worm gear 19 fixedly mounted to the bearing housing 13.

Once the tub 11 rotates through an angle of 90°, that is, when it is positioned at its horizontal position corresponding to the tub tilt angle of 0°, one end of the worm 18 pushes the corresponding switch lead 16a', thereby causing the worm motor 17 to stop.

When the tub 11 is desired to return from its horizontal position (0° to its vertical position (90°), the worm motor 17 drives reversely. By the reverse drive force of the worm motor 17, the tub 11 rotates toward its vertical position in the same manner as mentioned above.

When the tub 11 reaches its vertical position (90°), the other end of the worm 18 pushes the corresponding switch lead 16', thereby causing the worm motor 17 to stop.

However, this tub tilt angle sensing device equipped in the conventional convertible washing machine has several problems as follows.

First, the switches 16 and 16' and the stoppers 20 and 20' of worm gear 15 may be easily damaged because this conventional tub tilt angle sensing device is constructed to physically push switches 16 and 16', respectively, by both ends of the worm 18. Even after the worm motor 17 stops, the rotation of the tub 11 is continues due to the inertia of the rotating tub 11, thereby causing the worm 18 to strike against the leads 16' forcefully and 16a'. This causes damage to not only the switches 16 and 16', but also the stoppers 20 and 20' of worm gear 15.

Second, it is difficult to always maintain the tub at a desired tub tilt angle. Where the quantity of clothes to be washed is small, the washing operation is often carried out under a condition that the tub is maintained at a tilted position by an angle of about 45° so as to reduce the amount of washing water. In this case, however, it is difficult to always maintain the tub at a desired tub tilt angle.

Third, it is impossible to detect whether the current tub position corresponds to the horizontal position (0°) or the vertical position (90°) when the electric power once cut off is applied again.

SUMMARY OF THE INVENTION

Therefore, an object of the invention is to provide an apparatus for determining a tilt angle of a tub in a convertible washing machine, capable of determining the tub tilt angle without any mechanically-damageable striking of elements.

Another object of the invention is to provide an apparatus for and a method of determining a tilt angle of a tub in a convertible washing machine, capable of controlling the tub to be maintained not only at a horizontal position (0°) or a vertical position (90°), but also at a 45°-tilted position, thereby enabling the pulsator type washing, the drum type washing and the small load washing.

Another object of the invention is to provide an apparatus for and a method of determining a tilt angle of a tub in a convertible washing machine, capable of returning the tub to its intended position when the tub unintentionally deviates due to the weight thereof or vibration during an operation of the washing machine.

Another object of the invention is to provide a method for determining a tilt angle of a tub in a convertible washing machine, capable of detecting the tilted condition of the tub at an initial state at which electric power is initially applied to the convertible washing machine, and further capable of rotating the tub to a specific initial position, for example, a vertical position.

In accordance with one aspect, the present invention provides in a convertible washing machine capable of both drum type washing and pulsator type washing, an apparatus for determining a tilt angle of a tub among 90°, 45° and 0°, comprising: means fixed to said tub and having a first and a second moving ear for rotating corresponding to said tub when said tub rotates, said first and said second moving ear formed in series with a predetermined angle; means fixed to a base of said convertible washing machine regardless of said rotation of said tub and having a first and a second stationary ear for providing a reference point to said rotation of said moving ears, said first and said second stationary ear formed in series with said predetermined angle; means having a first sensor supported by said first stationary ear and a second sensor supported by said second stationary ear, for detecting whether each of said stationary ears is fully covered by an optional one of said moving ears as said tub rotates; and means for determining a tilt angle of said tub on the basis of said detection.

In accordance with another aspect, the present invention provides in a convertible washing machine capable of both drum type washing and pulsator type washing, which comprises means fixed to said tub and having a first and a second moving ear for rotating corresponding to said tub when said tub rotates, said first and said second moving ear formed in series with a predetermined angle and each having an outwardly extending ear portion of a predetermined width, means fixed to a base regardless of said rotation of said tub and having a first and a second stationary ear for providing a reference point to said rotation of said moving ears, said first and said second stationary ear formed in series with said predetermined angle, means having a first sensor supported by said first stationary ear and a second sensor supported by said second stationary ear, for detecting whether each of said stationary ears is fully covered by an optional one of said moving ears as said tub rotates, and means for determining a tilt angle of said tub on the basis of said detection, a method of determining a tilt angle of said tub when power is initially applied to said convertible washing machine, comprising the steps of: detecting whether each of said first sensor and said second sensor is at an ON state or an OFF state at an initial state when electric power is initially applied to said convertible washing machine, said ON state corresponding to a state at which each of said stationary ears is fully covered by an optional one of said moving ears; rotating said tub toward said first sensor by driving a worm motor for a predetermined time when said first sensor and said second sensor have been detected at said initial state to be at ON state and OFF state, respectively, checking whether both of said first sensor and said second sensor come to be at ON state, checking whether a predetermined time has elapsed when both of said first sensor and said second sensor have not come to be at ON state, determining said tilt angle of said tub at said initial state as $45° - N°$ and the current hilt angle of said tub as 90° when both of said first sensor and said second sensor have come to be at ON state before said predetermined time elapses, and determining said tilt angle of said tub at said initial state as 90° or $90° + \alpha°$ and the current tilt angle of said tub as $90° + \alpha°$ when both of said first sensor and said second sensor have not come to at ON state until said predetermined time elapses, said predetermined time corresponding to a time taken for an outwardly extending ear portion of each of said moving ears to pass through each of said first and second sensors, said N being an angle corresponding to the width of said outwardly extending ear portion, and $\alpha$ corresponding to a predetermined clearance for preventing said moving ears from coming into contact with other elements when said tub is positioned at its 0°-tilted position or its 90°-tilted position; determining both said tilt angle of said tub at said initial state and said current tilt angle of said tub as 45° when both of said first sensor and said second sensor have been detected at said initial state to be at ON state; rotating said tub toward said first sensor by driving said worm motor until said first sensor comes to be at ON state when both of said first sensor and said second sensor have been detected at said initial state to be at OFF state, further rotating said tub toward said first sensor by driving said worm motor for said predetermined time when said first sensor has come to be at ON state while checking whether both of said first sensor and said second sensor comes to be at ON state, determining said tilt angle of said tub at said initial state as an angle of more than 0°, but less than 45° and said current tilt angle of said tub as 45° when both of said first sensor and said second sensor have come to be at ON state before said predetermined time elapses, and determining said tilt angle of said tub at said initial state as an angle of more than 45°, but less than 90° and said current tilt angle of said tub as $90° + \alpha°$ when both of said first sensor and said second sensor have not come to be at ON state until said predetermined time elapses; and rotating said tub toward said first sensor by driving said worm motor until said first sensor comes to be at ON state when said first sensor and said second sensor have been detected at said initial state to be at OFF state and ON state, respectively, further rotating said tub toward said first sensor by driving said worm motor for said predetermined time when said first sensor has come to be at ON state while checking whether both of said first sensor and said second sensor come to be at ON state, determining said tilt angle of said tub at said initial state as 0° or $0° + \alpha°$ and said current tilt angle of said tub as 45° when both of said first sensor and said second sensor have come to be at ON state before said predetermined time elapses, and determining said tilt angle of said tub at said initial state as $45° + N°$ and said current tilt angle of said tub as $90° + \alpha°$ when both of said first sensor and said second sensor have not come to be at ON state until said predetermined time elapses.

In accordance with the present invention, the present invention provides in a convertible washing machine capable of both drum type washing and pulsator type washing, which comprises means fixed to said tub and having a first and a second moving ear for rotating corresponding to said tub when said tub rotates, said first and said second moving ear formed in series with a predetermined angle and each having an outwardly extending ear portion of a predetermined width, means fixed to a base regardless of said rotation of said tub and having a first and a second stationary ear for providing a reference point to said rotation of said moving ears, said first and said second stationary ear formed in series with said predetermined angle, means having a first sensor supported by said first stationary ear and a second sensor supported by said second stationary ear, for detecting whether each of said stationary ears is fully covered by an optional one of said moving ears as said tub rotates, and means for determining a tilt angle of said tub on the basis of said detection, a method of correcting an undesired angle change of said tub due to vibration when said convertible washing machine operates, comprising the steps of: continuously checking during an operation of said convertible washing machine whether said first sensor and said second sensor are at ON state and OFF state, respectively, corresponding to a vertical position of said tub, stopping said worm motor when said first sensor and said second sensor have been detected to be at ON state and OFF state, respectively, checking whether said first sensor comes to be at OFF state when said first sensor and said second sensor have not been detected to be at ON state and OFF state, respectively, and rotating said tub toward said first sensor by driving said worm motor until said first sensor comes to be at ON state when said first sensor has been detected to be at OFF state, said ON state corresponding to a state at which each of said stationary ears is fully covered by an optional one of said moving ears; continuously checking during an operation of said convertible washing machine whether said first sensor and said second sensor are at OFF state and ON state, respectively, corresponding to a horizontal position of said tub, stopping said worm motor when said first sensor and said second sensor have been detected to be at OFF state and ON state, respectively, checking whether said second sensor comes to be at OFF state when said first sensor and said second sensor have not been detected to be at OFF state and ON state, respectively, and rotating said tub toward said second sensor by driving said worm motor until said second sensor comes to be at ON state when said second sensor has been detected to be at OFF state; and continuously checking whether both of said first sensor and said second sensor are at ON state corresponding to a 45-tilted position of said tub, stopping said worm motor when both of said first sensor and said second sensor have been detected to be at ON state, checking whether said first sensor comes to be at OFF state when both of said first sensor and said second sensor have not been detected to be at ON state, rotating said tub toward said first sensor by driving said worm motor until said first sensor comes to be at ON state when said first sensor has been detected to be at OFF state, checking whether said second sensor comes to be at OFF state when said first sensor has not been detected to be at OFF state, and rotating said tub toward said second sensor by driving said worm motor until said second sensor comes to be at ON state when said second sensor has been detected to be at OFF state.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
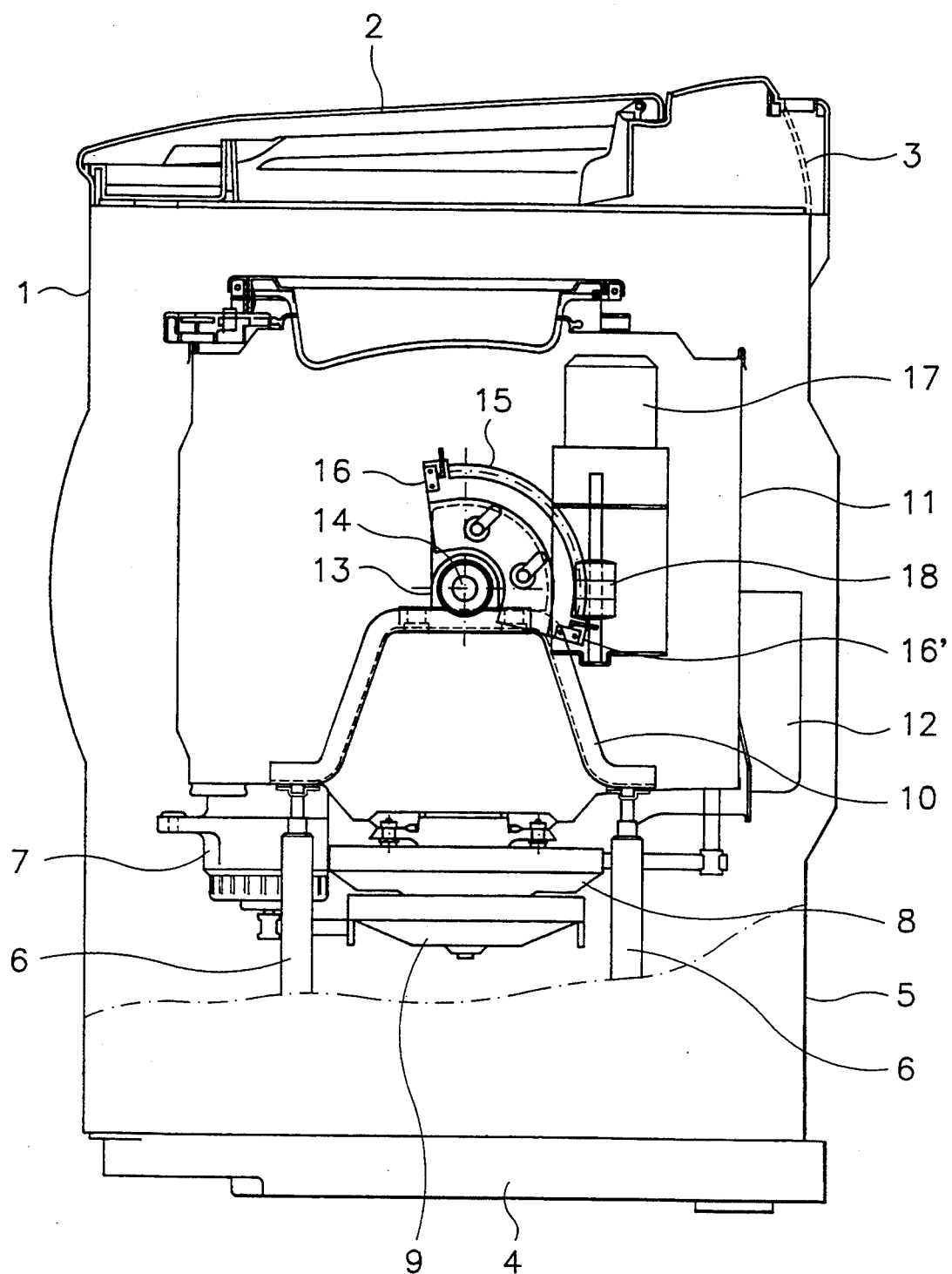
FIG. 1 is a partially-broken elevational view of a conventional convertible washing machine.
Figure 2:
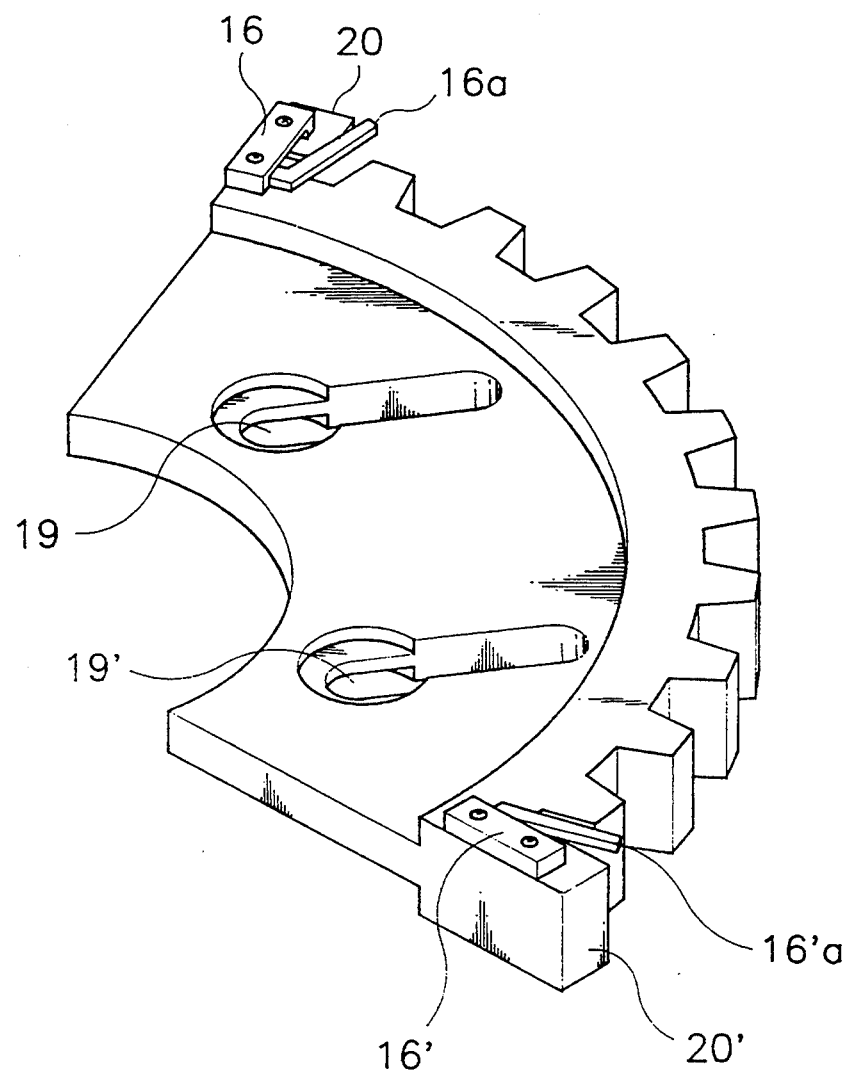
FIG. 2 is a tub tilt angle sensing device equipped in the conventional convertible washing machine shown in FIG. 1.
Figure 3:
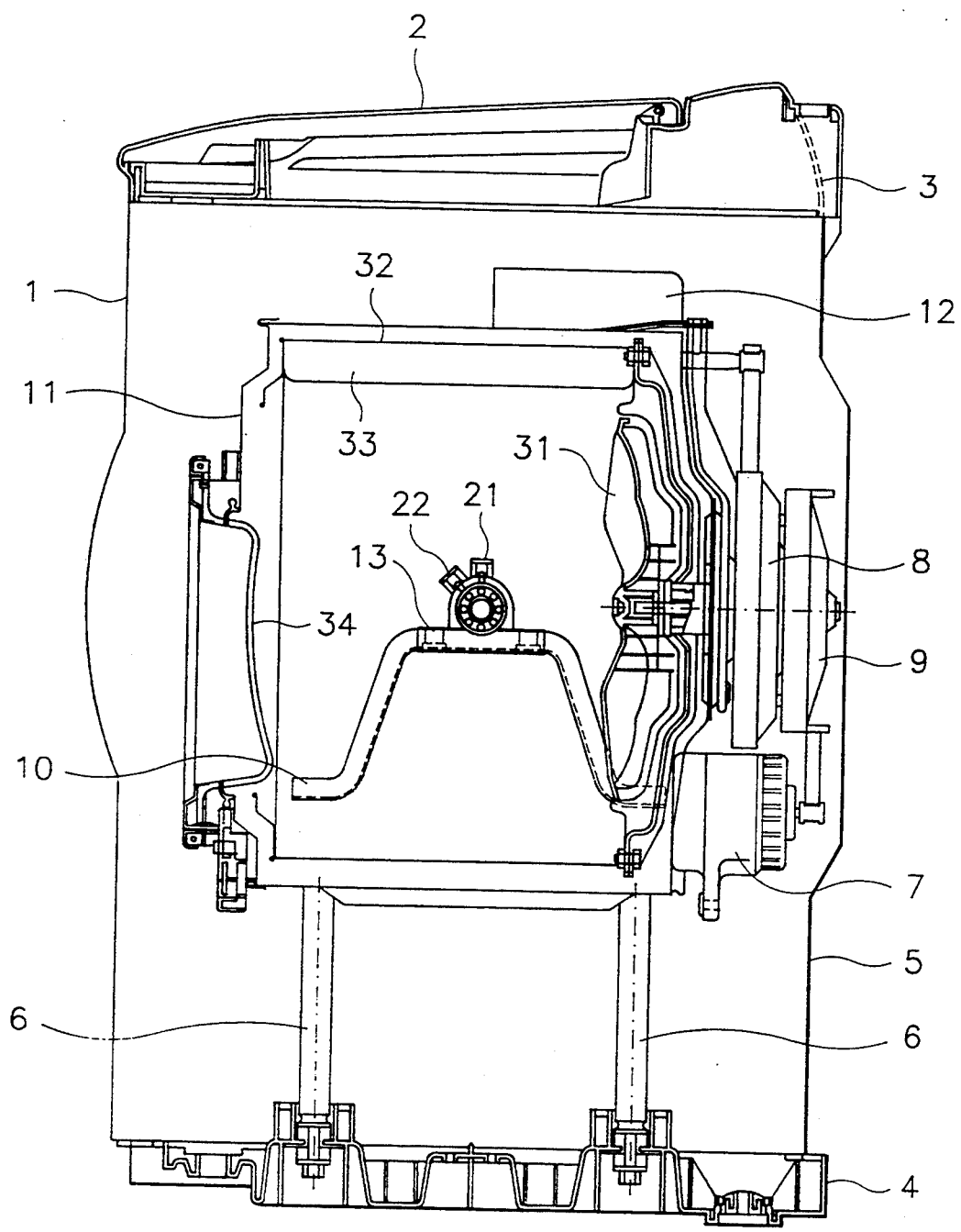
FIG. 3 is a partially-broken elevational view of a convertible washing machine equipped with an apparatus for determining a tilt angle of a tub in accordance with the present invention.
Figure 4:
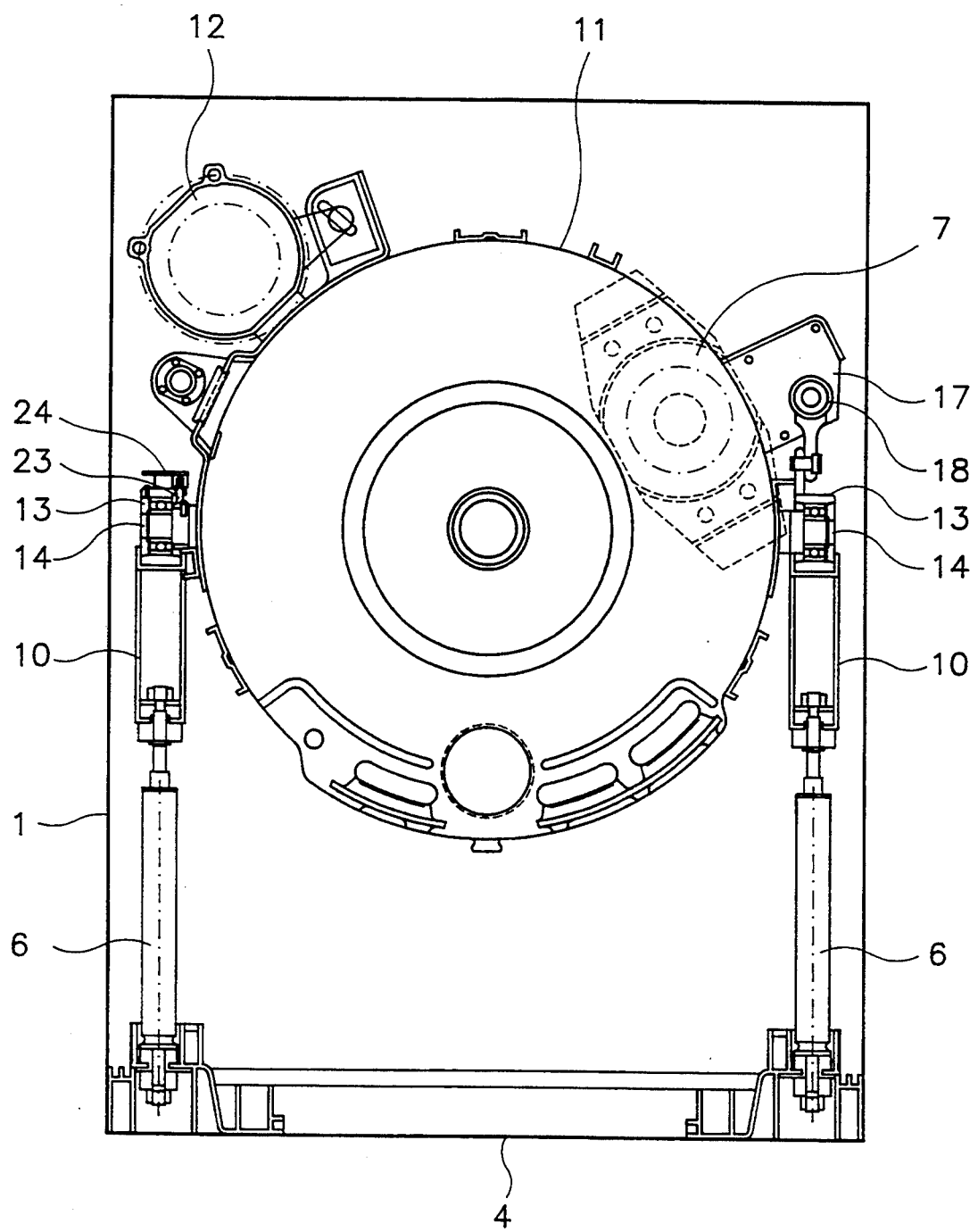
FIG. 4 is a front view of an internal construction of the convertible washing machine shown in FIG. 13.

Referring to FIGS. 3 and 4, a convertible washing machine is illustrated which is equipped with an apparatus for determining a tilt angle of a tub in accordance with the present invention. In FIGS. 3 and 4, elements corresponding to those in FIGS. 1 and 2 are denoted by the same reference numerals.

As shown in FIGS. 3 and 4, the convertible washing machine comprises an outer case 1 and a tub 11 disposed in the outer case 1. A plurality of dampers 6 are fixedly mounted to a base plate 4 of the outer case 1 to vertically extend from the base plate 4. The dampers 6 support a pair of damper brackets 10 at their upper ends.

A bearing housing 13 is fixedly mounted to the upper portion of each damper bracket 10. The bearing housing 13 serves to support each corresponding end of a tub shaft 14 provided at the tub 11.

The tub tilt angle determining apparatus of the present invention comprises a pair of photosensors 21 and 22 fixedly mounted to the bearing housing 13, and a photosensor actuating member 23 fixedly mounted to the tub shaft 14 to rotate together with the rotating tub 11 and transmit the rotation of the tub 11 to the photosensors 21 and 22.

Figure 5A:
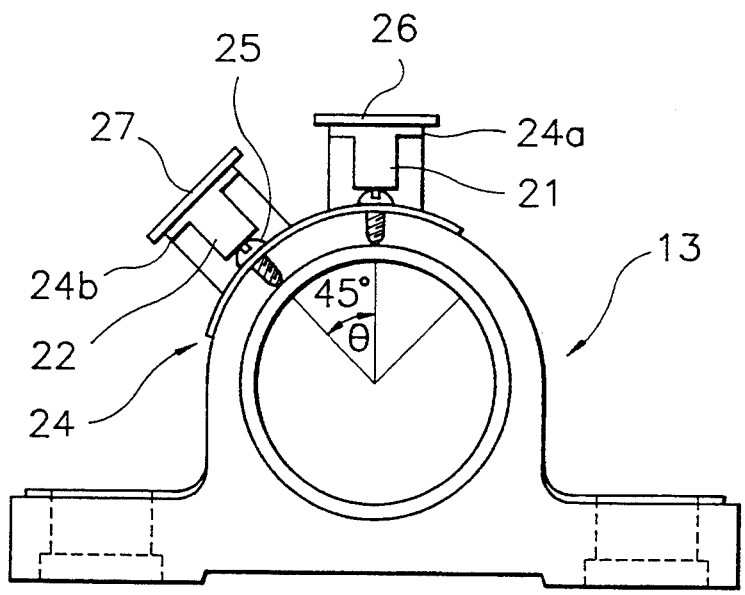
FIG. 5A is a front view of the tub tilt angle determining apparatus in accordance with the present invention.

The first photosensor 21 and the second photosensor 22 fixedly mounted on the circumferential surface of the bearing housing 13 are circumferentially spaced a predetermined angle $\theta$ from each other, as shown in FIG. 5A. The first photosensor 21 has a photoshield groove 21a whereas the second photosensor 22 has a photoshield groove 22a (see FIG. 6–7).

Figure 5B:
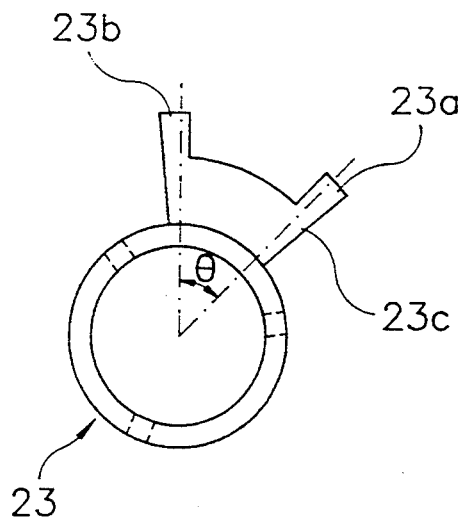
FIG. 5B is a schematic view of a photosensor actuating member of the tub ti It angle determining apparatus in accordance with the present invention.

The photosensor actuating member 23 has a pair of ear-shaped photoshield portions 23a and 23b circumferentially spaced a predetermined angle $\theta$ from each other, as shown in FIG. 5B. The photoshield portions 23a and 23b of photosensor actuating member 23 are positioned to pass through the photoshield grooves 21a and 22a of photosensors 21 and 22 during the rotation of the photosensor actuating member 23.

The photoshield portions 23a and 23b may be regarded as moving ears. In this case, the photoshield grooves 21a and 22a may be regarded as stationary ears for providing a reference point to the rotation of the photoshield portions 23a and 23b, that is, the moving ears.

In the illustrated embodiment of the present invention, the angle $\theta$ is 45° because the range of angles to be controlled is 0° to 90°.

Although the mounting of the photosensors 21 and 22 to the bearing housing 13 may be achieved by use of various mounting means, it is preferable to use the following means in accordance with an embodiment of the present invention.

Figure 7:
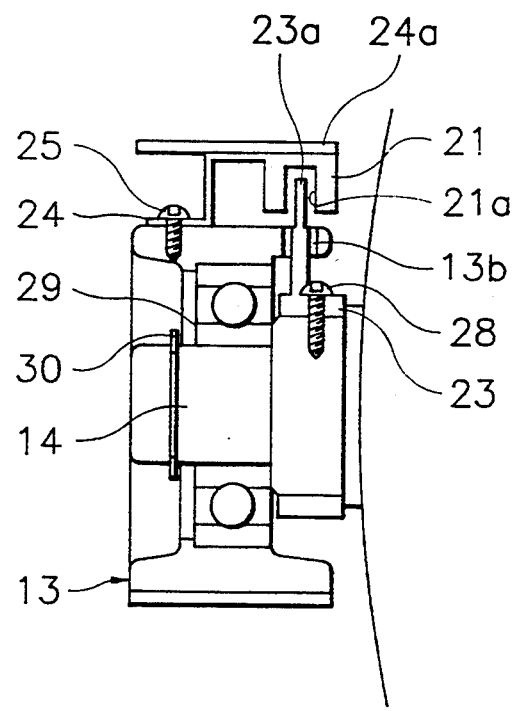
FIG. 7 is a sectional view of the tub tilt angle determining apparatus in accordance with the present invention.

As shown in FIGS. 5A, 5B and 7, a sensor bracket 24 is fixed to a cylindrical portion 13a of the bearing housing 13 by means of a plurality of set screws 25. The sensor bracket 24 has a pair of sensor mounting portions 24a and 24b downwardly bent. The photosensors 21 and 22 are fixedly mounted to respective lower surfaces of the sensor mounting portions 24a and 24b of the sensor bracket 24. To respective upper surfaces of the sensor mounting portions 24a and 24b, photosensor circuit boards 28 and 27 are attached.

Taking into consideration the angle $\theta$ defined between the photosensors 21 and 22, the sensor mounting portions 24a and 24b supporting the photosensors 21 and 22 are spaced from each other by an angle corresponding to the angle $\theta$.

The photosensor actuating member 23 which has a cylindrical shape is fitted around one end of the tub shaft 14 and fixed by means of a plurality of set screws 28. The photoshield portions 23a and 23b are provided at the outer circumferential surface of the photosensor actuating member 23.

Figure 6:
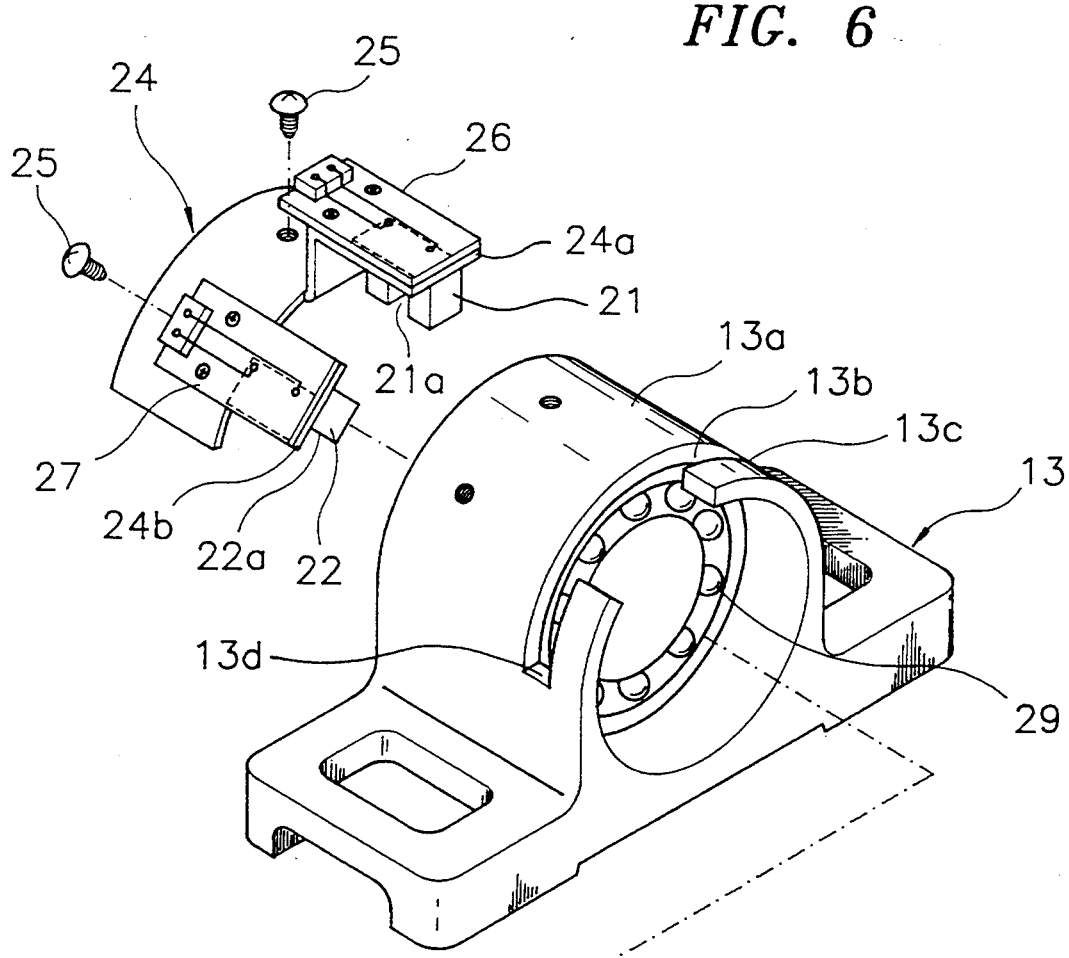
FIG. 6 is an exploded perspective view of the tub tilt angle determining apparatus in accordance with the present invention.
Figure 6:
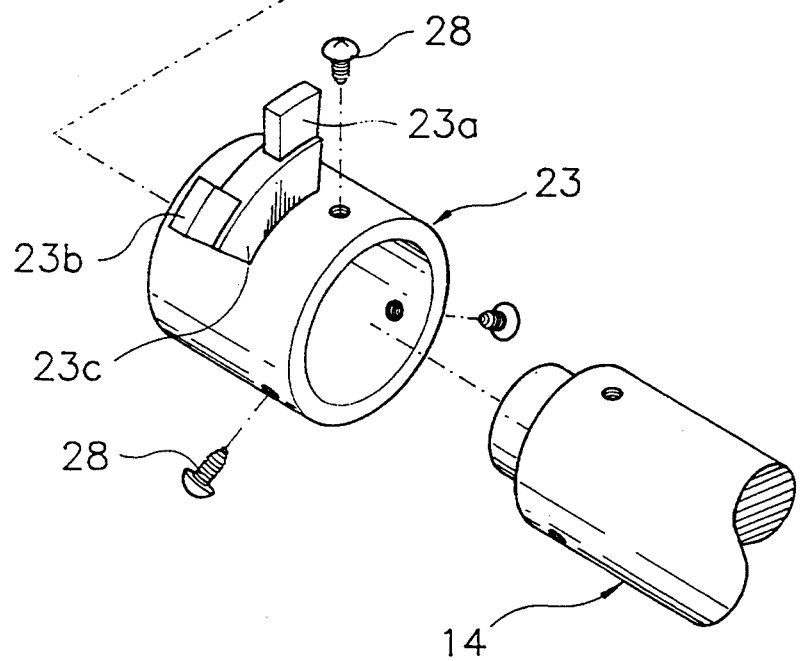

As shown in FIG. 6, the bearing housing 13 has an arc-shaped guide slot 13b receiving the photoshield portions 23a and 23b. The guide slot 13b has a circumferential length allowing the photoshield portions 23a and 23b to rotate through a predetermined angle.

The photoshield portions 23a and 23b of the photosensor actuating member 23 have such a large width that they have outward protrusions or ear portions circumferentially extending away from each other and beyond the photosensors 21 and 22, respectively, when they are aligned with the photosensors 21 and 22, respectively, at the 45°-tilted position of the tub 11. The construction of the photoshield portions 23a and 23b is needed to continuously maintain the tilted state of the tub 11 and sense the tilt angle of the tub 11 at an initial state at which electric power is initially applied to said convertible washing machine, as will be described hereinafter.

When the photoshield portions 23a and 23b are positioned in the photoshield grooves 21a and 21b, respectively, they shield between respective light emitting elements of the photosensors 21 and 22 and respective corresponding light receiving elements of the photosensors 21.

The guide slot 13b of bearing housing 13 should have such a circumferential length that it does not come into contact with the photoshield portions 23a and 23b when the tub 11 rotates through an angle ranged from 0° to 90°, but physically restricts a further rotation of the tub 11 beyond the angle range of 0° to 90°.

To this end, it is desirable to maintain a predetermined clearance between facing end surfaces of the guide slot 13b and each corresponding one of the photoshield portions 23a and 23b when the tub 11 is positioned at its 0°-tilted position and its 90°-tilted position.

That is, the guide slot 13b should have a circumferential length corresponding to the following angle A:

$$A = 135° + 2N° + \alpha$$

wherein,
N: an angle corresponding to a half of the width of each of photoshield portions 23a and 23b; and
$\alpha$: an angle corresponding to the predetermined clearance.

The photosensor actuating member 23 has a rib 23c having a thickness larger than those of the photoshield portions 23a and 23b so as to prevent possible damage of the photoshield portions 23a and 23b when the photoshield portions 23a and 23b selectively come into contact with corresponding end surfaces or stoppers 13c and 13d of the guide slot 13b.

In FIGS. 3 and 7, the reference numeral 29 denotes a bearing, 30 a stop ring, 31 a pulsator, 32 a drum, 33 a lift, and 34 a door.

In the pulsator type washing of the convertible washing machine having the above-mentioned construction, the pulsator 31 is rotated by the drive force of the pulsator motor 7 under a condition the tub 11 is vertically positioned, that is, at the tub tilt angle of 90°. For the drum type washing, the drum 32 is rotated by the drive force of the drum motor 12 under a condition that, the tub 11 is horizontally positioned, that is, at the tub tilt angle of 0°.

Where the quantity of clothes to be washed is small, a washing may be carried out in the same manner as in the pulsator type washing under a condition that the tub 11 is tilted 45°. In this case, an economical washing is achieved.

In al the washing types, charging of clothes to be washed is achieved by opening the outdoor 2 and the door 34 at the 90°-tilted position of the tub 11 and then putting the clothes into the opened tub 11.

Operation of the tub tilt angle determining apparatus of the present invention, which is applied to the convertible washing machine, will now be described in conjunction with FIGS. 5A to 11D.

Figure 8:
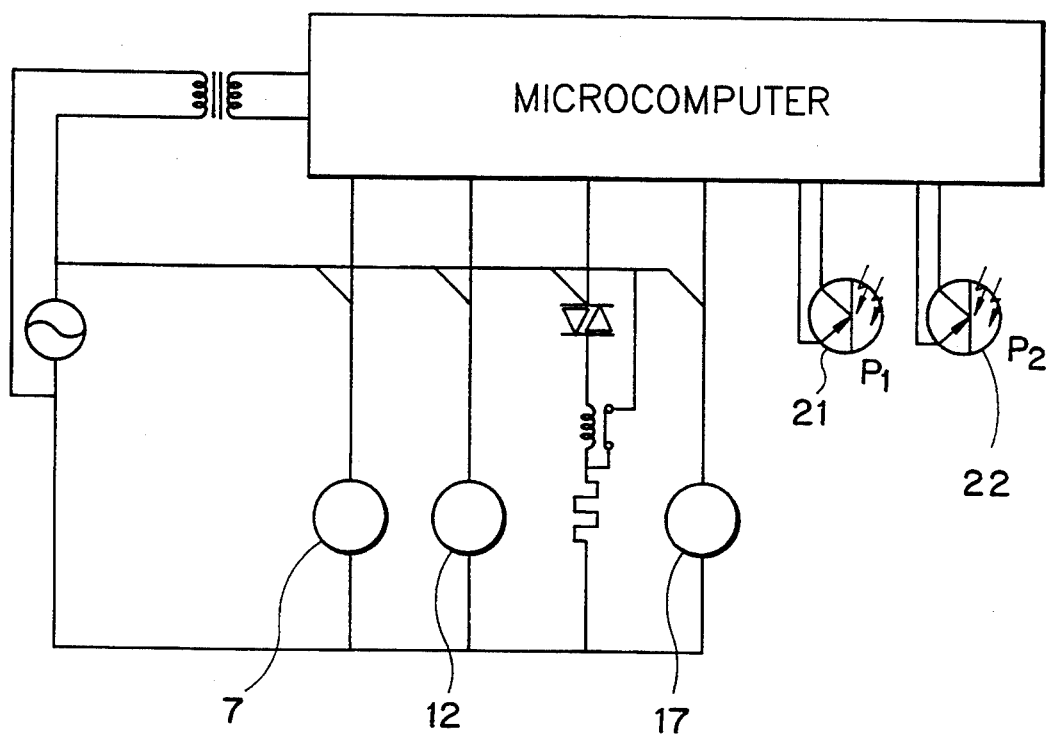
FIG. 8 is a circuit diagram of the tub tilt angle determining apparatus in accordance with the present invention.

As shown in FIG. 8, each of the photosensors 21 and 22 which are also denoted by respective reference characters $P_1$ and $P_2$ are constituted by a light emitting diode and a light receiving diode.

When the photoshield portions 23a and 23b pass through respective photoshield grooves 21a and 22a of the photosensors 21 and 22 during a rotation of the tub 11 and shield respective light receiving diodes of the photosensors 21 and 22 from respective corresponding light emitting diodes, the photosensors 21 and 22 supply predetermined signals to a microcomputer. Based on the received signals, the microcomputer controls the worm motor 17 so that the rotation angle of the tub 11 can be controlled.

In accordance with the illustrated embodiment of the present invention, the photosensors 21 and 22 have appropriate alignment relations with the photoshield portions 23a and 23b of the photosensor actuating member 23. As shown in FIGS. 5A and 5B, the first photosensor 21 is aligned with the second photoshield portion 23b when the tub 11 is positioned at its 90°-tilted position. When the tub 11 is positioned at its 45°-tilted position, the first photosensor 21 and the second photosensor 22 are aligned with the first photoshield portion 23a and the second photoshield portion 23b, respectively. At the 0°-tilted position of the tub 11, the second photosensor 22 is aligned with the first photoshield portion 23a.

Of course, the alignment relations among the photosensors and the photoshield portions may be varied, depending on the engineering design used.

Figure 9A:
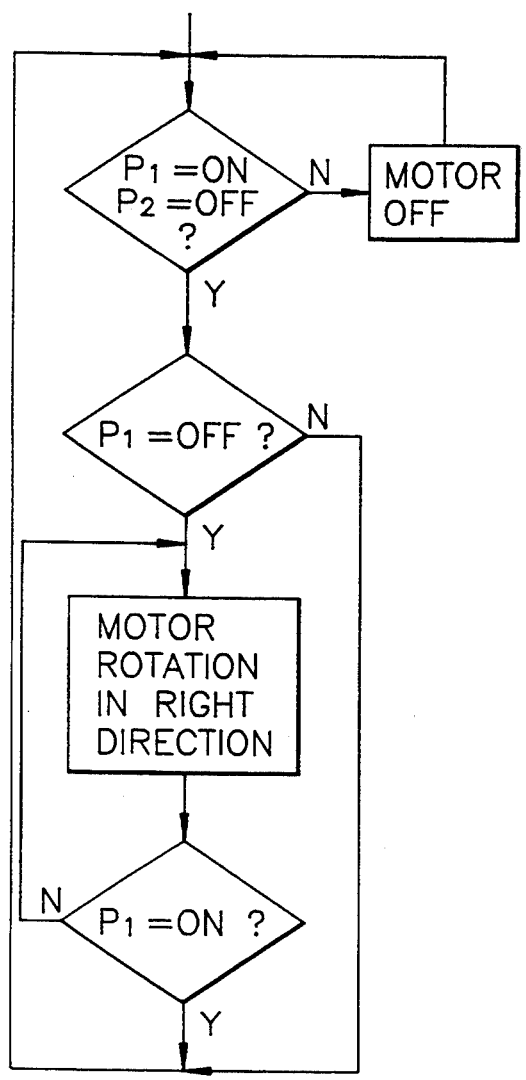
FIG. 9A to 9C are flowcharts respectively illustrating a method of maintaining the tilt angle of a tub in a convertible washer in accordance with the present invention.
Figure 9B:
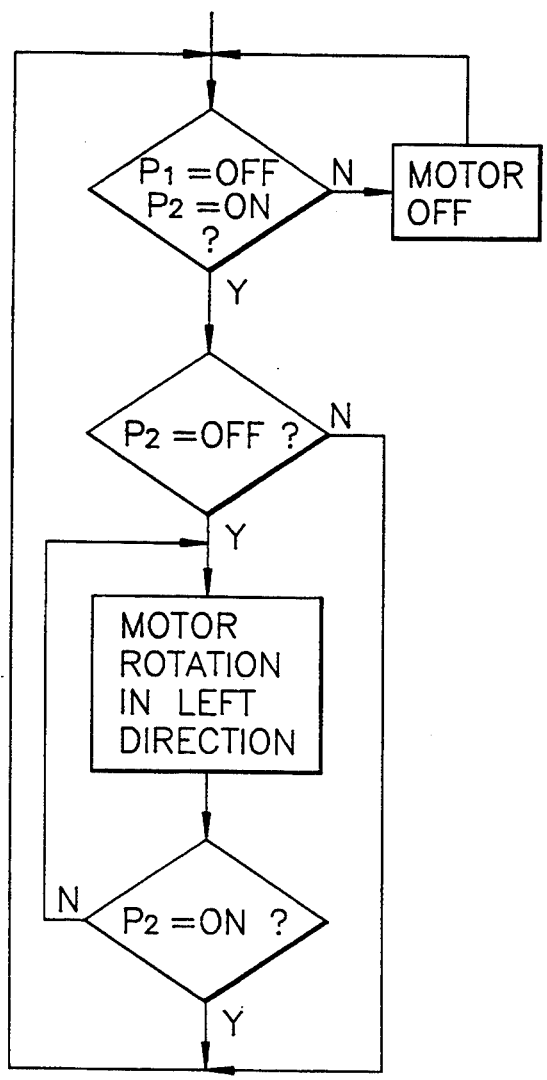
Figure 9C:
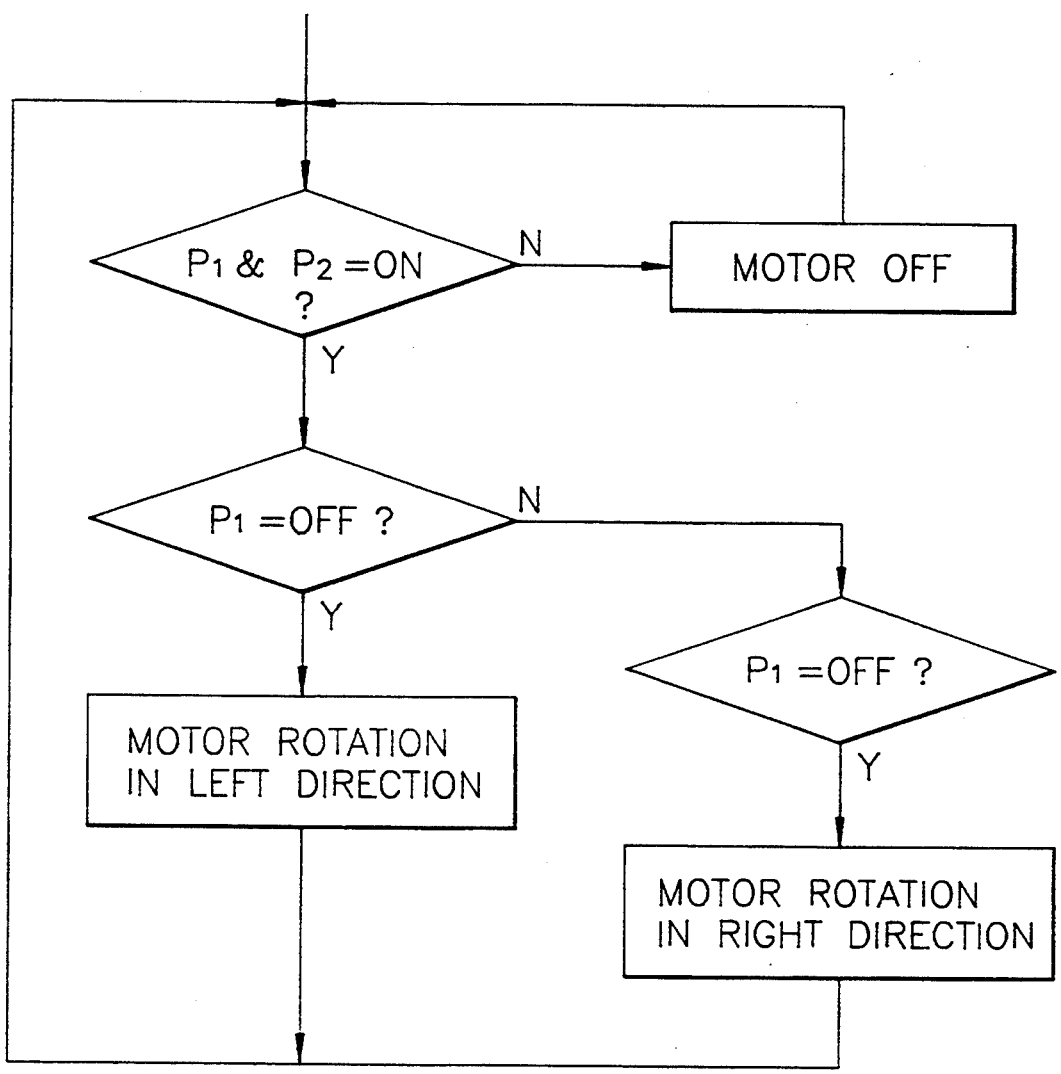

FIGS. 9A to 9C are flowcharts illustrating a control operation for returning the tub 11 unintentionally rotated due to the weight thereof or vibration in operation of the washing machine, to its originally tilted position. In the following description, the state "$P_1 = ON$" means that the first photosensor 21 has been shielded by one of the photoshield portions 23a and 23b. The state "P₂=ON" means that the second photosensor 22 has been shielded by one of the photoshield portions 23a and 23b.

FIG. 9A is a flowchart illustrating a control operation for maintaining the tub 11 at its vertical position, namely, its 90°-tilted position. This control operation will now be described in conjunction with FIG. 9A.

When the convertible washing machine operates at the vertical position of the tub 11, that is, under a condition that $P_1$ and $P_2$ are at ON state and OFF state, respectively, a checking is continuously made about whether $P_1$ has come to be at OFF state. Where the state "$P_1$=OFF" has not been detected, a determination is made that the tub 11 has not been moved yet. However, when the state "$P_1$=OFF" has been detected, the worm motor 17 rotate the tub 11 in the right direction, namely, clockwise or toward $P_1$ when viewed in FIG. 6 until $P_1$ achieves an ON state. The reason for rotating the tub in right direction is because the tub 11 is allowed by the right-side stopper to rotate only in left direction, namely, toward its horizontal position when it is positioned at its vertical position.

FIG. 9B is a flowchart illustrating a control operation for maintaining the tub 11 at its horizontal position, namely, its 0°-tilted position. This control operation will now be described in conjunction with FIG. 9B.

When the convertible washing machine operates at the horizontal position of the tub 11, that is, under a condition that $P_1$ and $P_2$ are at OFF state and ON state, respectively, a checking is continuously made about whether $P_2$ achieves an OFF state. Where the state "$P_2$=OFF" has not been detected, a determination is made that the tub 11 has not been moved yet. However, when the state "$P_2$=OFF" has been detected, the worm motor 17 drives to rotate the tub 11 in left direction, namely, counter-clockwise or toward $P_2$ when viewed in FIG. 6 until $P_2$ achieves ON state. The reason of rotating the tub in left direction is because the tub 11 is allowed by the left-side stopper to rotate only in right direction, namely, toward its vertical position when it is positioned at its horizontal position.

FIG. 9C is a flowchart illustrating a control operation for maintaining the tub 11 at its 45°-tilted position. This control operation will now be described in conjunction with FIG. 9C.

When the convertible washing machine operates under a condition that both of $P_1$ and $P_2$ are at ON state, a checking is continuously made about whether both of $P_1$ and $P_2$ achieved an ON state. Where the state "$P_1$ and $P_2$=ON" has been detected, a determination is made that the tub 11 has not been moved yet. However, when the state "$P_1$ and $P_2$=ON" has not been detected, a discrimination is made about whether $P_1$ has come to be at OFF state. When the state "$P_1$=OFF" has been detected, the worm motor 17 drives to rotate the tub 11 in left direction until both of $P_1$ and $P_2$ come to be at ON state. Where the state "$P_1$=OFF" has not been detected, a discrimination is made about whether $P_2$ has come to be at OFF state. Thereafter, the worm motor 17 drives to rotate the tub 11 in right direction until both of $P_1$ and $P_2$ come to be at ON state.

As mentioned above and as illustrated in FIG. 5B, the photoshield portions 23a and 23b of the photosensor actuating member 23 have a larger width than the photosensors 21 and 22 by a protrusion outwardly and circumferentially extended. Because of the constructions of the photoshield portions 23a and 23b, when $P_1$ switches to an OFF state from an ON state due to a slight movement of the tub 11 caused by vibrations during an operation of the convertible washing machine, it can be interpreted that the tub 11 has been rotated a little in right direction. Similarly, when $P_2$ switches to an OFF state from an ON state due to a slight movement of the tub 11 caused by vibrations during an operation of the convertible washing machine, it can be interpreted that the tub 11 has been rotated a little in left direction.

On the other hand, when the power supplied to the convertible washing machine is cut off, a memory equipped in the microcomputer for storing a present angle of the tub 11 is reset. To this end, when the electric power is applied to the convertible washing machine again, it is required to discriminate the tilt angle of the tub at the initial state of the power application so as to rotate the tub 11 to the position corresponding to the washing mode selected by the user.

In order to accomplish this operation, the outward protrusions of photoshield portions 23a and 23b of the photosensor actuating member 23 are also utilized in accordance with the illustrated embodiment of the present invention.

In other words, the initial position of the tub is detected by slightly rotating the tub in right direction or in left direction at an initial state at which electric power is initially applied to said convertible washing machine, and then sensing ON/OFF states of the photosensors 21 and 22 again, in accordance with the present invention.

For the simplicity of description, each outward protrusion of the photoshield portions 23a and 23b is assumed to have a width corresponding to the width of the corresponding photosensor so that each of the photoshield portions 23a and 23b may have a width corresponding to two times the width of each of the photosensors 21 and 22.

Now, the operation for discriminating the tilted position of the tub at an initial state at which electric power is initially applied to said convertible washing machine will be described, in conjunction with FIGS. 10A and 10B.

Figure 10A:
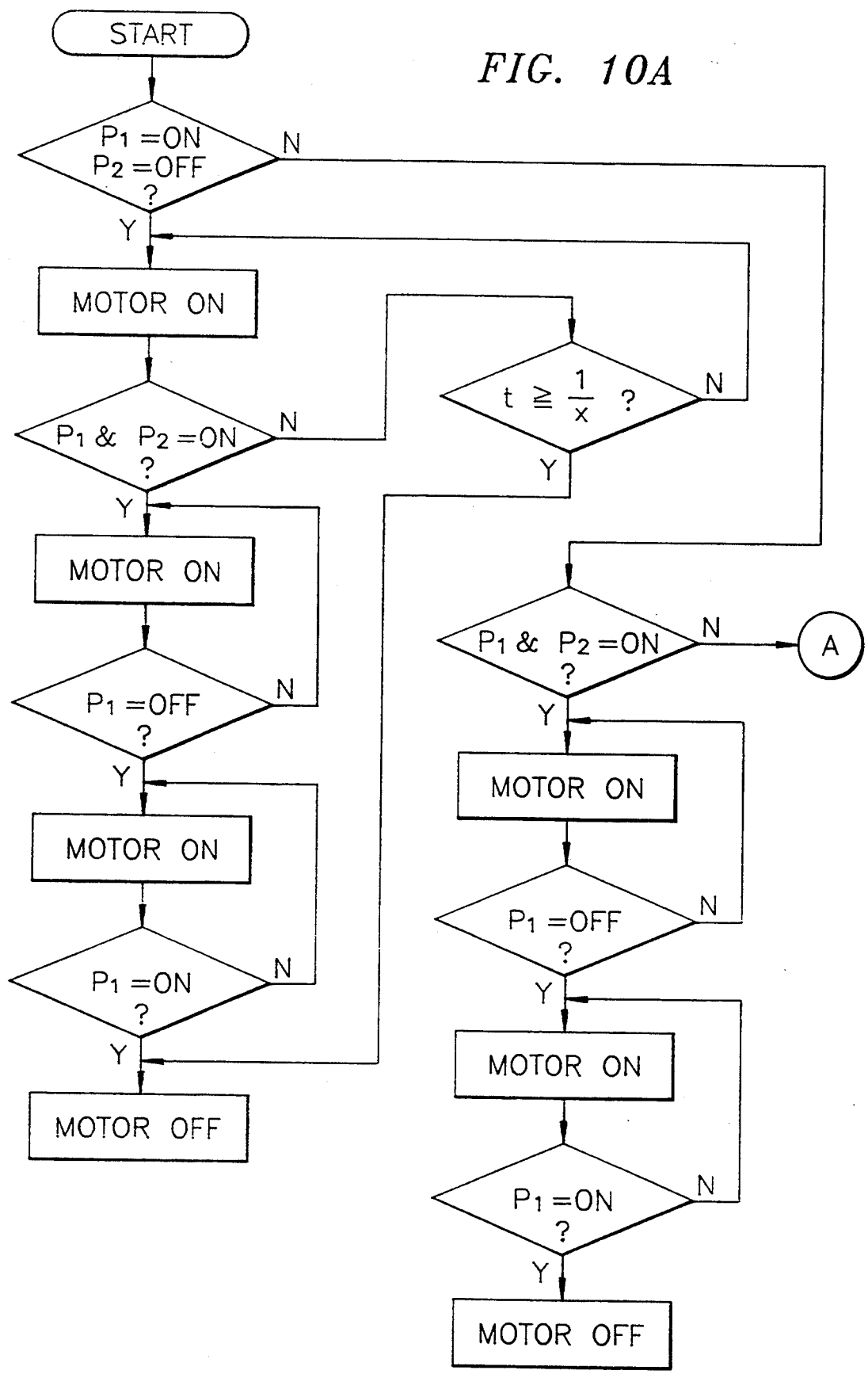
FIGS. 10A and 10B are flowcharts respectively illustrating a method of discriminating the tilted position of a tub at an initial state at which electric power is initially applied to a convertible washing machine.
Figure 10B:
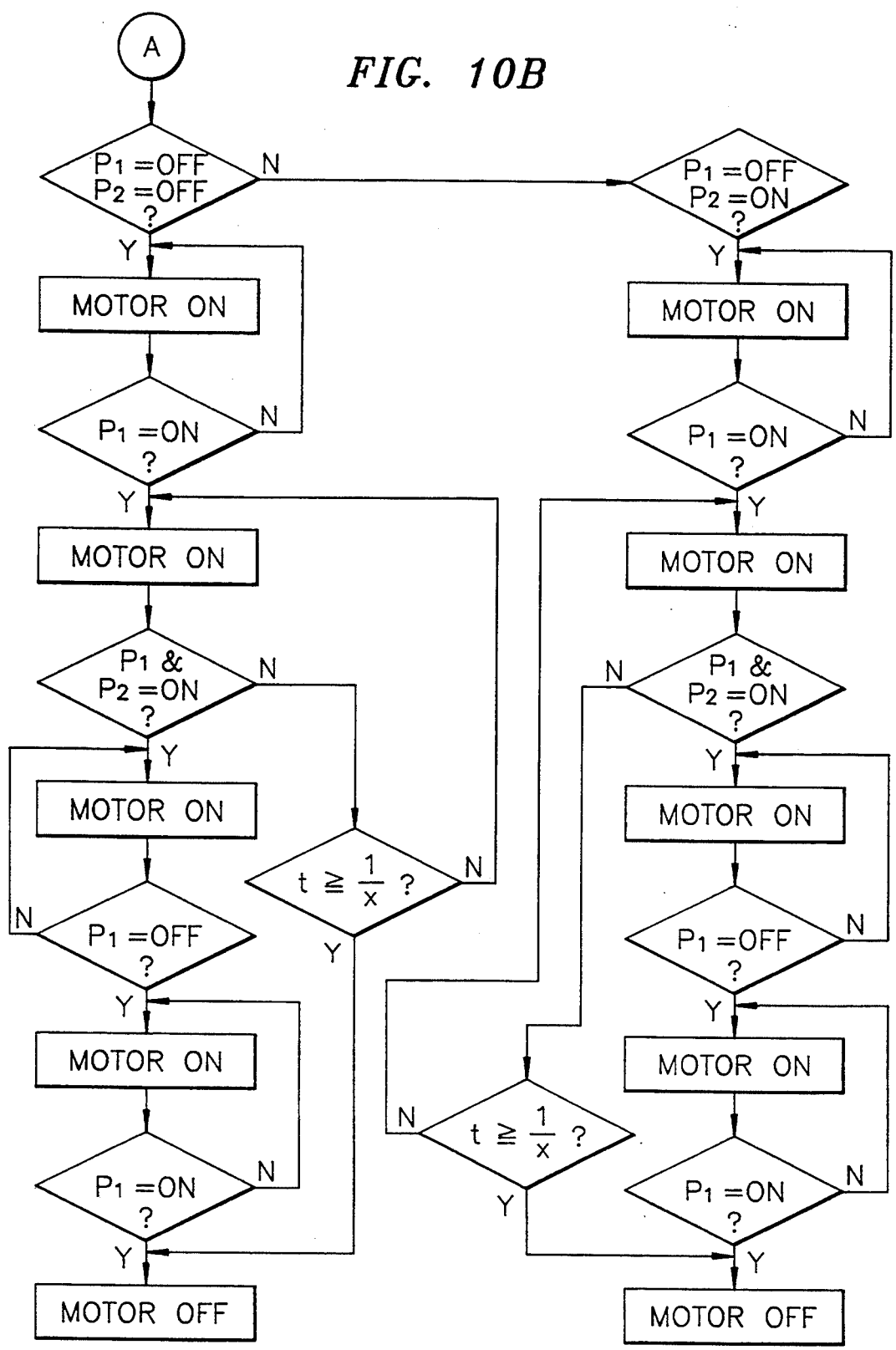

It is noted that the procedure illustrated in FIGS. 10A and 10B include the steps performed until the tub 11 is positioned at its vertical position (90°) after completion of the discrimination about the position of the tub 11, for the simplicity of description.

The ON/OFF states of the photosensors 21 and 22, namely, $P_1$ and $P_2$ discriminated at the initial state of electric power application will include four cases as follows:

$P_1$=ON and $P_2$=OFF; (1)

$P_1$=ON and $P_2$=ON; (2)

$P_1$=OFF and $P_2$=OFF; and (3)

$P_1$=OFF, $P_2$=ON. (4)

Primarily, the first case "$P_1$=ON and $P_2$=OFF" will be described.

The first case "$P_1$=ON and $P_2$=OFF" will correspond to one of the following cases:

(1-A) when $P_1$ is covered by the outward protrusion of the first, photoshield portion 23a, that is, when the tilt angle of the tub 11 at the initial state of electric power application corresponds to the angle of 45°−N°;

(1-B) when $P_1$ is covered by the second photoshield portion 23b, that is, when the tilt angle of the tub 11 at the initial state of electric power application corresponds to the angle of 90°; and (1-C) when $P_1$ is covered by the outward protrusion of the second photoshield portion 23b, that is, when the tilt angle of the tub 11 at the initial state of electric power application corresponds to the angle of 90°+N°.

The case (1-C) does not occur because the tub 11 can not rotate in right direction beyond its 90°-tilted position, at which the rib 23c of the photosensor actuating member 23 is in contact with the stopper 13c of the guide slot 13b, even when the driving of the worm motor 17 is continued.

In either case, the worm motor 17 is driven for a predetermined time to rotate the tub 11 in the right direction. Then, a check is made whether both of $P_1$ and $P_2$ have achieved an ON state. By this checking, both the initial state and the current state of the tub 11 can be discriminated.

In this case, the predetermined time means the time taken for the tub 11 to rotate through an angle corresponding to the width of the outward protrusion of each of the photoshield portions 23a and 23b. The right direction means the direction that the tub 11 rotates toward its vertical position (90°) or the first photosensor 21.

When both of $P_1$ and $P_2$ have achieved an ON state after the driving of worm motor 17 for the predetermined time, a determination is made that the position or the tilt angle of the tub 11 at the initial state of electric power application corresponds to the case (1-A) wherein $P_1$ is covered by the outward protrusion of the first photoshield portion 23a and the tilt angle of the tub corresponds to the angle of 45°−N°. Simultaneously, a determination is also made that the current position of the tub 11 corresponds to the 45°-tilted position.

Then, the worm motor 17 is further driven to rotate the tub 11 in right direction until $P_1$ achieves an OFF state and then an ON state, thereby causing the tilt angle of the tub 11 to be changed from 45° to 90°.

Where the state "$P_1$=ON and $P_2$=ON" is not detected even after the driving of worm motor 17 for the predetermined time, a determination is made that the initial position or the initial tilt angle of the tub 11 corresponds to the case (1-B) wherein $P_1$ is covered by the second photoshield portion 23b and the initial tilt angle of the tub 11 corresponds to the angle of 90° or to the case (1-C) wherein $P_1$ is covered by the outward protrusion of the second photoshield portion 23b and the initial tilt angle of the tub 11 corresponds to the angle of 90°+α°. Simultaneously, a determination is also made that the current position of the tub 11 corresponds to the vertical position, namely the 90°-tilted position. As mentioned above, the angle of a is the predetermined clearance between facing end surfaces of the guide slot 13b and the photoshield portions 23a when the tub 11 is positioned at its 90°-tilted position.

In other words, since the tub I 1 has al ready been positioned at the 90°-tilted position or the 90°+α°-tilted position, the state "$P_1$=ON and $P_2$=ON" does not occur even when the worm motor 17 is driven for the predetermined time to rotate the tub 11 in right direction.

In this case, the continued driving of worm motor 17 cause the rotation of tub 11 no longer because the rib 23c of the photosensor actuating member 23 is in contact with the stopper 13c of the guide slot 13b.

Next, the second case wherein the state "$P_1$=ON and $P_2$=ON" is detected at the initial state of electric power application will be described.

In the second case, both the initial position and the current of the tub 11 correspond to the 45°-tilted position. Accordingly, the worm motor 17 is driven to rotate the tub 11 in right direction until $P_1$ achieves an OFF state and then at ON state, thereby causing the tub 11 to be positioned at the 90°-tilted position, in similar to the case (1-A) of the first case.

Next, the third case wherein the state "$P_1$=OFF and $P_2$=OFF" is detected at the initial state of electric power application will be described.

The third case "$P_1$=OFF and $P_2$=OFF" will correspond to one of the following cases:

(3-A) when $P_1$ is positioned between the first photoshield portion 23a and the second photoshield portion 23b; and (3-B) when $P_2$ is positioned between the first photoshield portion 23a and the second photoshield portion 23b.

in this third case, the worm motor 17 is driven to rotate the tub 11 in right direction until $P_1$ achieves at ON state.

This state "$P_1$=ON" corresponds to one of the following cases:

(3-A-a) when $P_1$ is covered by the second photoshield portion 23b, that is, when the tilt angle of the tub 11 corresponds to the angle of 90°, by the rotation of tub 11 in right direction from the state of the case (3-A); and (3-B-a) when $P_1$ is covered by the outward protrusion of the first photoshield portion 23a, that is, when the tilt angle of the tub 11 corresponds to the angle of less than 45°, by the rotation of tub 11 in right direction from the state of the case (3-B).

These cases (3-A-a) and (3-B-a) correspond to the cases (A-1) and (A-2) of the first case (A), respectively. It is, therefore, possible to distinguish the case (3-A-a) from the case (3-B-a) by driving the worm motor 17 for the predetermined time and then detecting whether both of $P_1$ and $P_2$ have come to be at ON state.

In other words, when both of $P_1$ and $P_2$ achieves an ON state after the driving of worm motor 17 for the predetermined time, a determination is made that the position or the tilt angle of the tub 11 at the initial state of electric power application corresponds to an angle of more than 0°, but less than 45°. Simultaneously, a determination is also made that the current position of the tub 11 corresponds to the 45°-tilted position.

Then, the worm motor 17 is further driven to rotate the tub 11 in right direction until $P_1$ achieves an OFF state and then at ON state, thereby causing the tilt angle of the tub 11 to be an angle of more than 45°, but less than 90°.

Where the state "$P_1$=ON and $P_2$=ON" is not detected even after the driving of worm motor 17 for the predetermined time, a determination is made that the initial position or the initial tilt angle of the tub 11 corresponds to an angle of more than 45°, but less than 90°. Simultaneously, a determination is also made that the current position of the tub 11 corresponds to an angle of 90°+N°.

Finally, the fourth case wherein the state "$P_1$=OFF and $P_2$=ON" is detected at the initial state of electric power application will be described.

The fourth case "$P_1$=OFF and $P_2$=ON" will correspond to one of the following cases:

(4-A) when P₂ is covered by the outward protrusion of the first photoshield portion 23a, that is, when the tilt angle of the tub 11 at the initial state of electric power application corresponds to the angle of 0°−N°;

(4-B) when P₂ is covered by the first photoshield portion 23a, that is, when the tilt angle of the tub 11 at the initial state of electric power application corresponds to the angle of 0°; and (4-C) when P₂ is covered by the outward protrusion of the second photoshield portion 23b, that is, when the tilt angle of the tub 11 at the initial state of electric power application corresponds to the angle of 45°+N°.

In either case, the worm motor 17 is driven for a predetermined time to rotate the tub 11 in right direction until P₁ achieves an ON state.

This state "P₁=ON" corresponds to one of the following cases:

(4-A-a or 4-B-a) when P₁ is covered by the outward protrusion of the first photoshield portion 23a, that is, when the tilt angle of the tub 11 corresponds to the angle of 45°−N°, by the rotation of tub 11 in right direction from the state of the case (4-A) or the case (4-B); and (4-B-a) when P₁ is covered by the second photoshield portion 23b, that is, when the tilt angle of the tub 11 corresponds to the angle of 90°, by the rotation of tub 11 in right direction from the state of the case (4-C).

These cases (4-A-a or 4-B-a) and (4-C-a) correspond to the cases (A-1) and (A-2) of the first case (A), respectively. It is, therefore, possible to distinguish the cases (4-A-a), (4-B-a) and (4-C-a) from one another by driving the worm motor 17 for a predetermined time and then discriminating about whether both of P₁ and P₂ have achieves an ON state.

When both of P₁ and P₂ have achieves an ON state after the driving of worm motor 17 for the predetermined time, a determination is made that the position of the tub 11 at the initial state of electric power application corresponds to one of the cases (4-A) or (4-B). This is because the current state means that the outward protrusion of the first photoshield portion 23a has just passed through P₁, but P₁ is fully covered by the first photoshield portion 23a by the rotation of tub 11. That is, this precedent state corresponds to the case (4-A-a or 4-B-a). On the other hand, when the state "P₁=ON and P₂=ON" is not detected even after the driving of worm motor 17 for the predetermined time, a determination is made that the position of the tub 11 corresponds to the case (4-C). This is because the current state means that the rib 23c of the photosensor actuating member 23 has already been in contact with the stopper 13c of the guide slot 13b, so that the tub 11 can rotate in right direction no longer even though the driving of the worm motor 17 continues. That is, this precedent state corresponds to the case (4-C-a).

In the former case (4-A ) or (4-B ), the worm motor 17 is continuously driven to rotate the tub 11 in right direction until P₁ achieves an OFF state and then at ON state, thereby causing the tub 11 to be positioned at the 90°-tilted position, in similar to the case (1-A) of the first case. On the other hand, the worm motor 17 is stopped in the latter case (4-C) because the rib 23c of the photosensor actuating member 23 has already been in contact with the stopper 13c of the guide slot 13b.

Figure 11A:
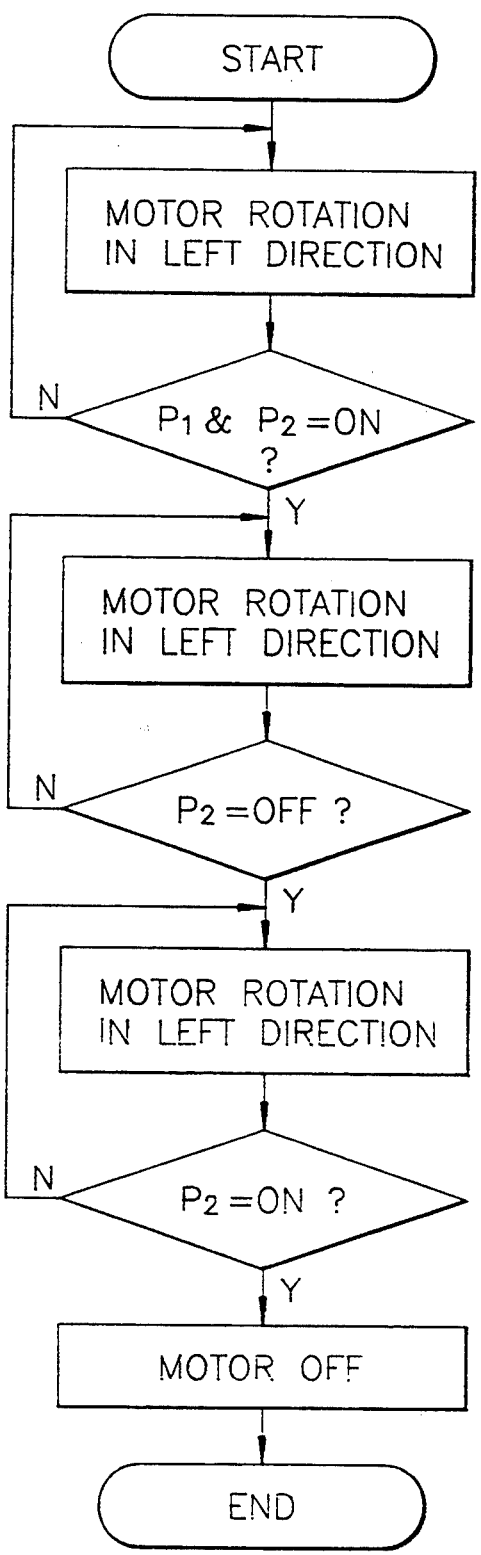
FIGS. 11A to 11D are flowcharts respectively illustrating control operations of the tub tilt angle determining apparatus for rotating the tub from various positions to desired tilted positions in accordance with the present invention.
Figure 11B:
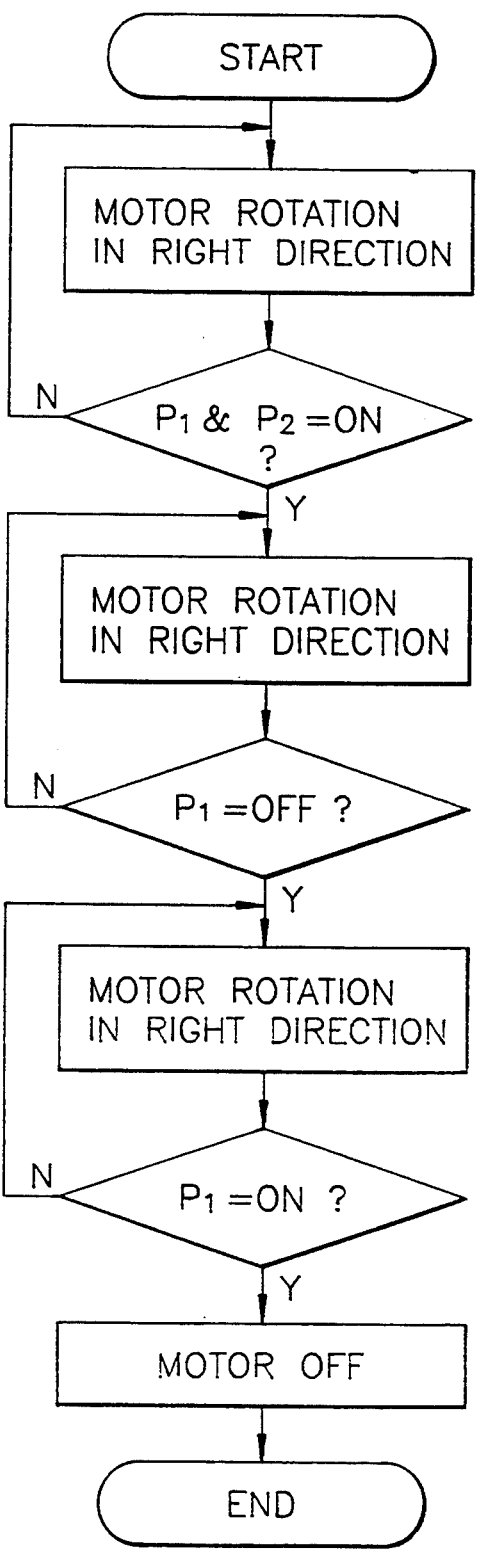
Figure 11C:
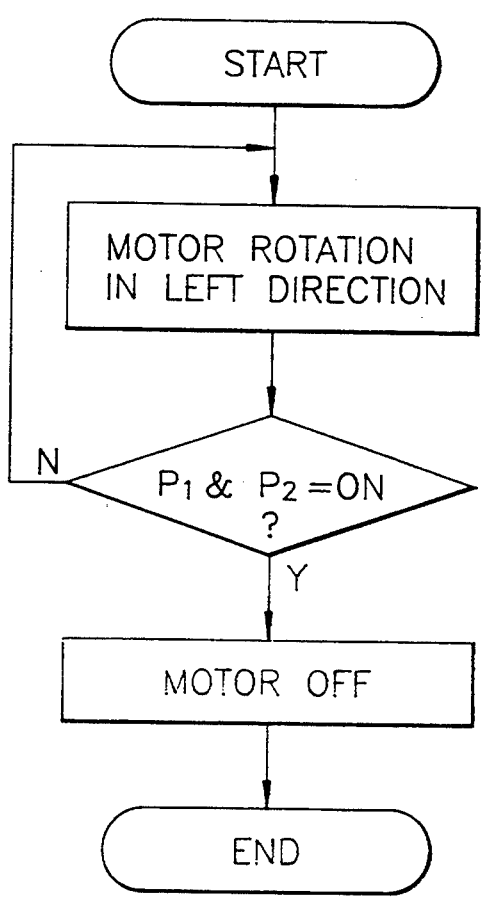
Figure 11D:
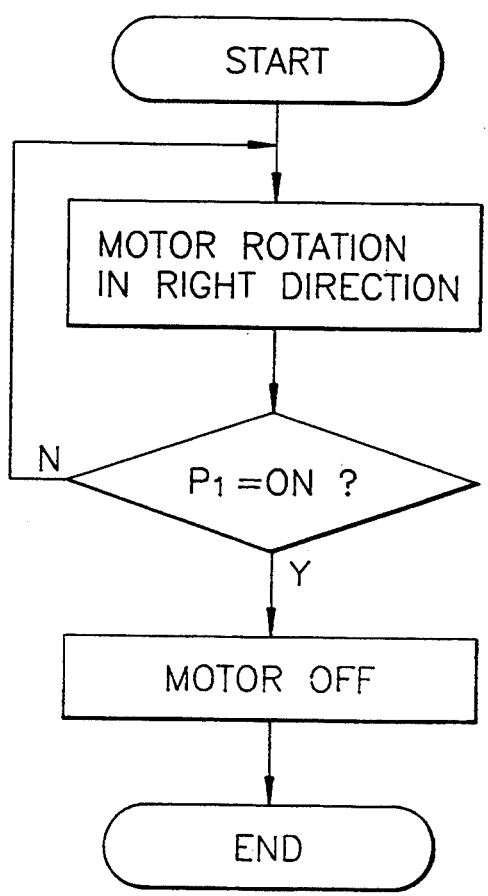

FIGS. 11A to 11B are flowcharts respectively illustrating operations for rotating the tub 11 from 90°-, 45°- and 0°-tilted positions to desired tilted positions. These operations can be sufficiently understood by referring to the above description made in conjunction with FIGS. 10A and 10B and thus their detailed description will be omitted.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

In the embodiment illustrated in FIGS. 10A and 10B, the tub is once rotated in right direction (when viewed in FIG. 5B) after completion of the detection for its initial position so that it can be positioned at its 90°-tilted position. On the contrary, the tub may be once rotated in left direction (when viewed in FIG. 5B) after completion of the detection for its initial position so that it can be positioned at its 0°-tilted position.

Although the 90°-tilted position of the tub has been assumed to be obtained when the first photosensor is fully covered by the second photoshield portion, it can be assumed to be obtained when the second photosensor is fully covered by the first photoshield portion.

In accordance still another embodiment, a plurality of photoshield portions and a plurality of photosensors may be used, even although two photoshield portions and two photosensors are used for carrying out control operations at 90°-, 45°- and 0°-tilted tub positions in the illustrated embodiments. In this case, control operations at more various tub tilt angles can be accomplished. Where photoshield portions and photosensors are arranged within 45° such that each photoshield portion and each photosensor is positioned at every 5° position, the tub can be controlled by every 5° within a range of 0° to 90°.

What is claimed is:

1. An apparatus for controlling a tilt angle of a tub in a convertible washing machine which converts between drum type washing and pulsator type washing, said convertible washing machine including a tub shaft which rotates said tub and a tilt angle motor for changing a tilt angle of said tub to effect conversion of said convertible washing machine between drum type washing and pulsator type washing, said apparatus comprising:

rotating means for rotating with said tub, said rotating means including at least first and second projections; and at least first and second reference means fixed to said convertible washing machine such that said first and second reference means are stationary when said tub rotates, said first reference means for detecting when one of said first and second projections is at a first predetermined position, and said second reference means for detecting when one of said first and second projections is at a second predetermined position.

2. The apparatus of claim 1, further comprising:

determination means for determining a tilt angle of said tub based on output from said first reference means and said second reference means.

3. The apparatus of claim 1, further comprising:

control means for controlling said tilt angle motor based on output from said first reference means and said second reference means so that said tub achieves a desired tilt angle.

4. The apparatus of claim 3, wherein said control means controls said tilt angle motor, based on said output from said first and second reference means, to maintain said tub at at least one of a zero degree position, a forty-five degree position, and a ninety degree position.

5. The apparatus of claim 3, wherein said control means controls said tilt angle motor, based on said output from said first and second reference means, to change said tub between at least one of a zero degree position and a ninety degree position, a zero degree position and a forty-five degree position, and a forty-five degree position and a ninety degree position.

6. The apparatus of claim 3, wherein said control means controls said tilt angle motor, based on said output from said first and second reference means, to move said tub to at least one of a zero degree position, a forty-five degree position, and a ninety degree position.

7. The apparatus of claim 1, wherein said rotating means includes a cylindrical member with said first and second projections projecting radially from an outer radial surface of said cylindrical member, and said first and second projections projecting from said cylindrical member such that first and second lines extending radially from an axis of said cylindrical member and through said first and second projections form a predetermined angle.

8. The apparatus of claim 7, wherein said cylindrical member is mounted to said tub shaft.

9. The apparatus of claim 7, further comprising:
restricting means for restricting an angle through which said tub can rotate.

10. The apparatus of claim 9, wherein said restricting means includes a cylindrical housing having an arc shaped guide slot formed therein, said cylindrical member being housed in said cylindrical housing such that said first and second projections project through said guide slot.

11. The apparatus of claim 10, wherein said cylindrical member includes a rib projecting radially from said outer radial surface of said cylindrical member and through said arc shaped guide slot, and said first and second projections project radially from an outer radial surface of said rib.

12. The apparatus of claim 10, further comprising
a mounting member mounted on a radially outer surface of said cylindrical housing; and
said first and second reference means being mounted to said mounting member.

13. The apparatus of claim 10, wherein said first and second projections each have a predetermined width.

14. The apparatus of claim 13, wherein said arc shaped guide slot has a circumferential length corresponding to an angle:

$$135° + 2N° + a$$

where N is an angle corresponding to one-half of said predetermined width, and is a predetermined clearance angle.

15. The apparatus of claim 7, wherein
said first and second reference means are positioned radially from and circumferentially about said cylindrical member at said first and second predetermined positions, respectively.

16. The apparatus of claim 15, wherein
said first reference means includes a first photodetector, said first photodetector having a photoshield groove through which said first and second projections pass through when said tub rotates; and
said second reference means includes a second photodetector, said second photodetector having a photoshield groove through which said first and second projections pass through when said tub rotates.

17. The apparatus of claim 1, further comprising:
restricting means for restricting an angle through which said tub can rotate.

18. The apparatus of claim 17, wherein said restricting means allows said tub to rotate from a zero degree position to a ninety degree position.

19. The apparatus of claim 1, wherein said first and second reference means are positioned at said first and second predetermined positions, respectively, and include first and second sensors, respectively, said first sensor positioned such that said first sensor outputs a signal when one of said first and second projections is at said first predetermined position, and said second sensor positioned such that said second sensor outputs a signal when one of said first and second projections is at said second predetermined position.

20. The apparatus of claim 19, wherein said first and second sensors are photodetectors.

21. The apparatus of claim 1, wherein
said first reference means outputs a first signal when one of said first and second projections is at said first predetermined position;
said second reference means outputs a second signal when one of said first and second projections is at said first predetermined position;
said tub is at a zero degree position when said first projection is at said second predetermined position;
said tub is at a ninety degree position when said second projection is at said first predetermined position.

22. The apparatus of claim 21, wherein said tub is at a forty-five degree position when said first projection is at said first predetermined position and said second projection is at said second predetermined position.

23. A convertible washing machine which converts between drum type washing and pulsator type washing, comprising:
a tub;
a tub shaft which rotates said tub;
a tilt angle motor for changing a tilt angle of said tub to effect conversion of said convertible washing machine between drum type washing and pulsator type washing;
rotating means for rotating with said tub, said rotating means including at least first and second projections; and
at least first and second reference means fixed to said convertible washing machine such that said first and second reference means are stationary when said tub rotates, said first reference means for detecting when one of said first and second projections is at a first predetermined position, and said second reference means for detecting when one of said first and second projections is at a second predetermined position.

24. The apparatus of claim 23, further comprising:
determination means for determining a tilt angle of said tub based on output from said first reference means and said second reference means.

25. The apparatus of claim 23, further comprising:
control means for controlling said tilt angle motor based on output from said first reference means and said second reference means so that said tub achieves a desired tilt angle.

* * * * *